United States Patent [19]
Panossian

[11] Patent Number: 5,365,842
[45] Date of Patent: Nov. 22, 1994

[54] PRESS CYLINDER WITH NON-OBSTRUCTIVE PARTICLE DAMPING

[75] Inventor: Hagop V. Panossian, Tarzana, Calif.

[73] Assignee: Rockwell International Corporation, El Segundo, Calif.

[21] Appl. No.: 866,911

[22] Filed: Apr. 10, 1992

[51] Int. Cl.⁵ .................................................. B41F 5/00
[52] U.S. Cl. ................................ 101/216; 464/180; 188/378
[58] Field of Search ............... 101/212, 216; 188/378, 188/268; 464/180; 74/574

[56] References Cited

U.S. PATENT DOCUMENTS

| | | | |
|---|---|---|---|
| 1,912,840 | 6/1933 | Havill | 188/268 |
| 2,375,818 | 5/1945 | Peters | 188/268 |
| 2,417,347 | 3/1947 | Brown | 188/268 |
| 2,469,167 | 5/1949 | Little | 188/268 |
| 3,923,414 | 12/1975 | Hopkins | 188/378 |
| 4,125,073 | 11/1978 | Bain | 101/216 |
| 4,487,123 | 12/1984 | Köbler et al. | 101/216 |
| 4,739,702 | 4/1988 | Kobler | 101/216 |
| 5,081,881 | 1/1992 | Ide | 74/574 |
| 5,095,786 | 3/1992 | Bellinghausen et al. | 74/574 |

Primary Examiner—Edgar S. Burr
Assistant Examiner—Lynn D. Hendrickson
Attorney, Agent, or Firm—C. B. Patti; H. F. Hamann

[57] ABSTRACT

A printing press (10) having a rotatable cylinder (40) having at least one cavity (26) positioned within the cylinder (40), a device (50) for rotating the cylinder (40), and a damping material (12) in said cavity (26) to reduce the vibration amplitude of the cylinder (40).

15 Claims, 5 Drawing Sheets ial may be a liquid, such as oil, or the damping material may be a solid, such as a metallic powder, or a non-metallic powder, such as sand, as desired.

PRESS CYLINDER WITH NON-OBSTRUCTIVE PARTICLE DAMPING

CROSS-REFERENCE TO RELATED APPLICATION

This application is related to application Ser. No. 630,581, filed Dec. 20, 1990, and assigned to the assignee of the present invention.

BACKGROUND OF THE INVENTION

The present invention relates to cylinders for a printing press.

In the past, printing presses have been known to utilize: a plate cylinder (having a plate with an image to be printed), and a blanket cylinder (passing an ink image from the plate cylinder to a paper web). However, it has been found that such cylinders may have high amplitude structural resonance vibrations at the relative high operating speeds of the press. This condition causes undesirable streaks of the printed image on the printed web.

The following patents disclose various devices which may include particles in an opening: U.S. Pat. Nos. 2,375,818, 1,912,840, 2,984,453, 2,417,347, 2,469,167, 2,641,940, and GB 1,230,274.

SUMMARY OF THE INVENTION

A principal feature of the present invention is the provision of an improved cylinder for a printing press.

The invention comprises, a cylinder having an outer surface, and a plurality of bores extending laterally across the cylinder adjacent the outer surface.

A feature of the present invention is the provision of a damping material at least partially filling the bores.

Another feature of the invention is that the damping material comprises a powder or larger particles.

Still another feature of the invention is that the powder may comprise a metallic material, a non-metallic material, or the damping material may comprise a liquid.

A feature of the invention is that the damping material is a function of the frequency of vibration of the cylinder.

Yet another feature of the invention is that the damping material substantially reduces the vibration amplitude of the cylinder.

A feature of the invention is that the device damps high amplitude structural resonance vibrations in cylinder.

Yet another feature of the invention is that the damping material may be selected to provide optimum damping effectiveness.

Another feature of the invention is that the cylinder is of simplified construction.

Further features will become more fully apparent the following description of the embodiments of the invention, and from the appended claims.

DESCRIPTION OF THE PREFERRED EMBODIMENTS

Figure 1:
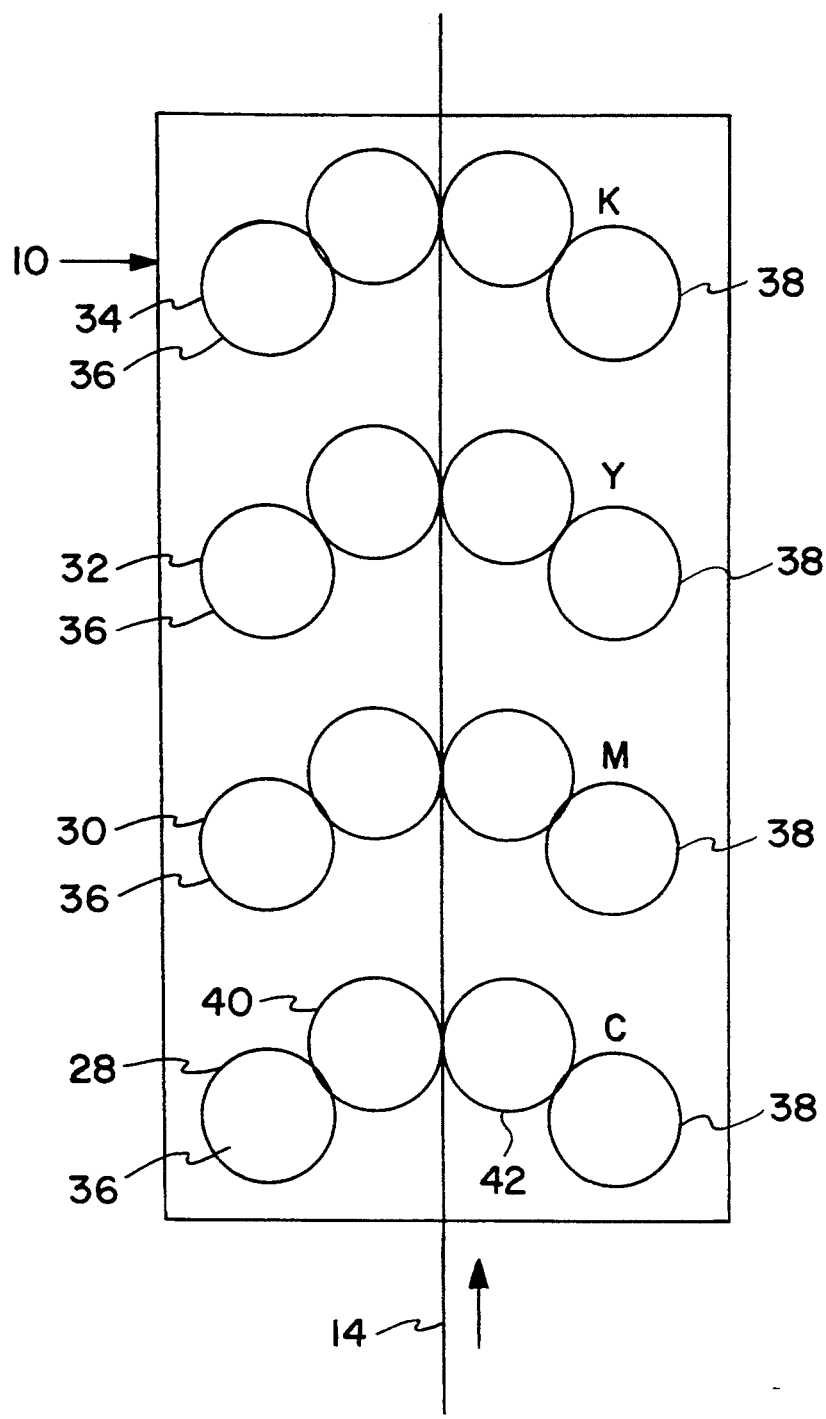
FIG. 1 is a diagrammatic view of a printing press of the present invention.

Referring now to FIG. 1, there is shown a printing press generally designated 10 for printing an image on a paper web 14. The press 10 has a plurality of printing units 28, 30, 32, and 34 for printing different colors of ink on the web 10. As shown, the printing unit 28 may print an ink having a color Cyan C, the printing unit 30 may print an ink having a color Magenta M, the printing unit 32 may print an ink having the color Yellow Y, and the printing unit 34 may print an ink having a color black K in a four-color press 10. The printing units may be disposed either vertically, as shown, or horizontally, if desired.

The printing units 28, 30, 32, and 34 each have a plurality of plate rolls or cylinders 36 associated with a blanket cylinder or roll 40. During printing by the press 10, an image of the ink is transferred from the plate rolls 36 to the associated blanket rolls 40 to print the image on one surface 20 of the web 14. In addition the press 10 may have a plurality of printing units having a plurality of plate rolls 38 associated with a plurality of blanket rolls or cylinders 42 on an opposed side of the web 14 in order to transfer the ink image from the plate rolls 38 to the blanket rolls 42 for printing an image on the other surface 22 of the web 10. The following description of the plate and blanket rolls is equally applicable to either the print and blanket rolls 36 and 40 or the plate and blanket rolls 38 and 42 on the opposed sides 20 and 22 of the web 14. For convenience, the invention will be described in connection with the blanket roll or cylinder 40, although it will be understood that the invention is equally applicable to the other rolls of the press 10, including the plate rolls 36 and 38, and the blanket roll 42.

Figure 2:
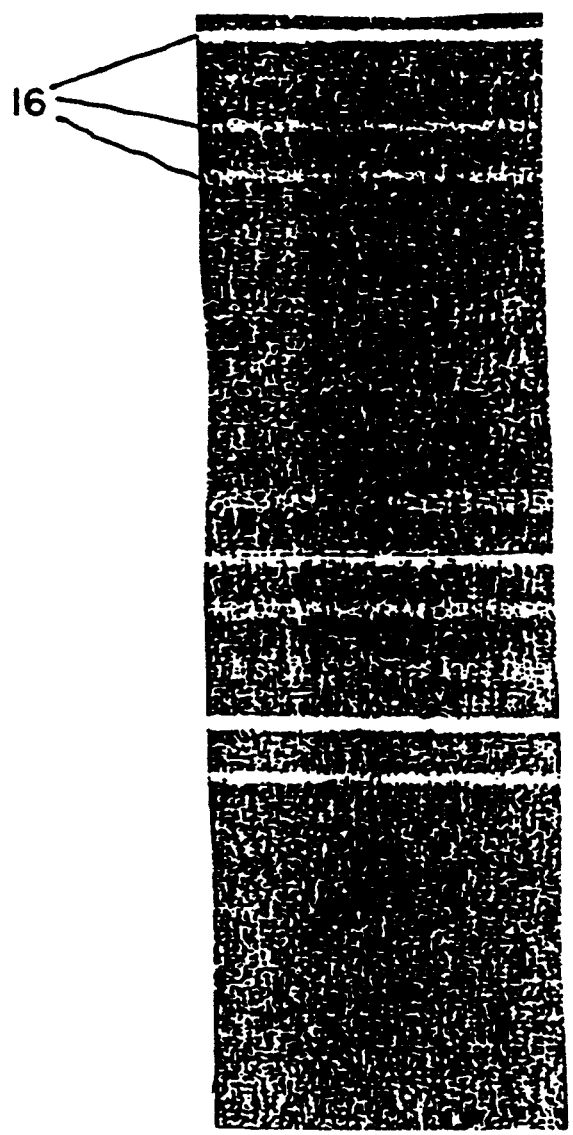
FIG. 2 is a plan view of a printing pattern on a web.

As shown in FIGS. 2, during operation of the press 10 at high speeds, such as the rate of 40,000 newspapers per hour, light streaks 16 may appear in the printed image on the printed web 10 due to first bending mode vibration of the cylinder 40. Such streaks degrade the quality of the newspaper, and it is thus desirable to eliminate such streaks from the printed material in order to provide a printed material with enhanced appearance.

Figure 3:
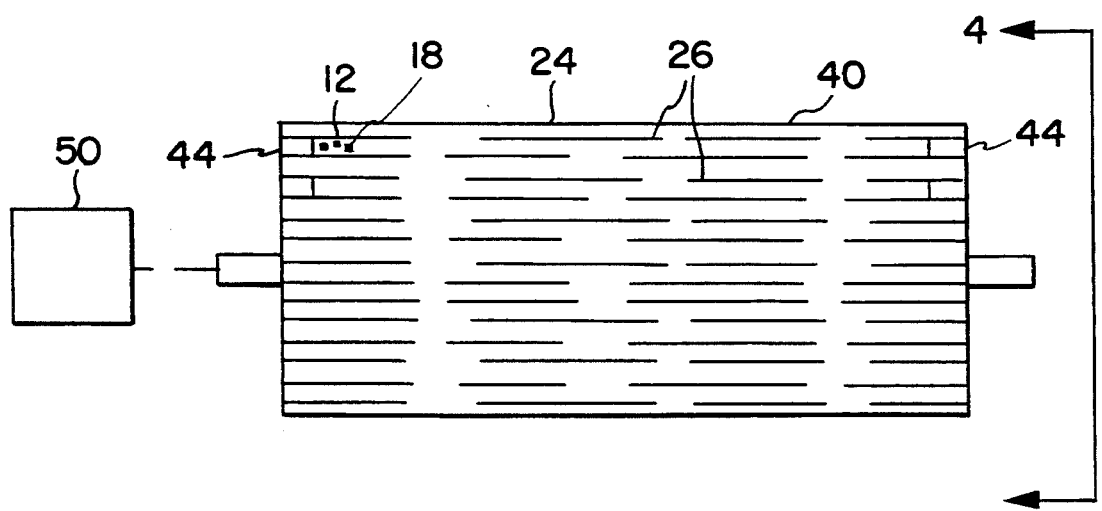
FIG. 3 is an elevational view of a cylinder of the present invention.
Figure 4:
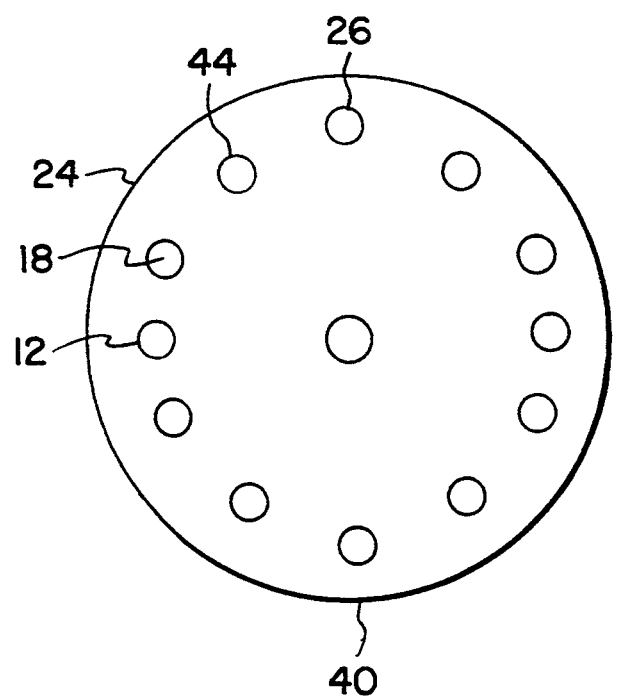
FIG. 4 is an end view of the cylinder taken substantially as indicated along the line 4—4 of FIG. 3.

As shown in FIGS. 3 and 4, the press 10 may have a suitable motor 50 to rotate the cylinder 40. The cylinder 40 has an outer surface 24, and a plurality of bores 26 extending laterally across the cylinder 40 adjacent the outer surface 24 of the cylinder 40 located in the load path of the vibrating cylinder 40, i.e., the area of the cylinder 40 where the vibrations are the greatest, with a number of bores 26 being located peripherally around the cylinder 40. The bores 26 are at least partially filled with a suitable damping material having a powder or larger particles 18, and in a preferred form the bores 26 are only partially filled with the powder 18. In accordance with the present invention, the powder 18 damps high amplitude resonant vibrations in the cylinder 40 in order to obtain an improved printed product without the streaks 16. The locations for the introduction of the powder 18 is based upon finite element and vibration and modal analyses, and the damping material 12 yields the highest damping effectiveness. The damping material 12 is selected according to its material characteristics, relative size and shape in order to optimize the damping effect.

The bores 26 may comprise any suitable opening or cavity, and their location and dimensions are determined by the initial analyses. The bores 26 or openings are also selected in a manner such that they do not affect the strength of the cylinder 40 which may be constructed from any suitable material, such as aluminum or steel, while the bores 26 and associated damping material 12 still yield sufficient damping for the vibration mode of interest. The bores 26 may be formed in the cylinder 40 by drilling, an electro discharge machine, or laser drilling. In a preferred form, the bores 26 have a diameter in the range of 0.0001 inches and 2 inches, and more preferably in the range of 0.010 inches to about 0.080 inches in diameter.

The damping material 12 is introduced into the bores 26, and the ends of the bores 26 may be sealed by suitable plugs 44, or any other suitable manner of closing the bores 26, such as welding or tape strips. The damping material 12 is selected in accordance with the environment of the cylinder 40, and should not change its physical characteristics under which conditions the cylinder 40 is utilized in the press 10. The damping material 12 is also selected as a function of the frequency of vibration of the cylinder 40.

The powder or particles 18 may comprise solid metallic and non-metallic particles, or a mixture thereof. For example, the metallic particles may comprise steel, lead, copper, aluminum, tungsten, and nickel particles, and non-metallic materials, such as ceramic particles, such as zirconium oxide and silicon nitride particles, and viscoelastic or rubber-like particles. Also, metals in the form of liquids, such as mercury liquid may be used. A liquid damping material is preferred for very low frequencies, while small particles is preferred for relatively high frequencies.

The size of the solid particles which are used for the damping material 12 is relative to the size of the bores 26, and generally should not be larger than about half the diameter of the bores. Although the shape of the powder or particles 18 may vary, it is preferred that the particles 18 may be spherical in shape in the cylinder 40 due to the centrifugal force fields during operation of the press 10, since undesirable compaction is less likely to take place under high compaction force functions. The density of the particles 18 is a constraint related to mass. If it is not desired to utilize a substantial mass in the cylinder 40, then lighter density particles 18, such as aluminum powder, may be used in place of a heavier tungsten powder. Also, the more viscous the damping material, the lower the frequency which can be damped, and the less viscous the damping material, the higher the frequencies which can be attenuated.

In a preferred form, the mass of the damping material 12 is less than the mass of the material removed from the bores 26. It is also preferred to only partially fill the bores 26 with the damping material, such as filling the bores 26 until they are 70% to 90% full. After the bores 26 have been formed in the cylinder, the bores 26 are closed at the opposite ends of the bores 26 by the plugs 44.

The final design of the invention is selected for incorporation of the damping material 12 into the cylinder 40 in order to damp vibrations according to the present invention. The location and size of the bores 26 is selected, and the desired amount of damping material 12 is added to the bores 26 in accordance with certain initial procedural designs.

First, a finite element analysis (FEA) is made which is a vibration analysis of the cylinder 40 to determine the vibration and frequency mode shapes of the cylinder 40. Thus, a finite element model of the vibrating cylinder 40 is made to provide information regarding frequencies, damping ratios, and the highest displacement locations, thus providing information for the best location of the bores 26. Under low to intermediate frequencies, displacements are large and frictional forces are dominant, while at high frequencies, other energy dissipation mechanisms are more dominant. Thus, this procedure determines vibration frequencies and amplitudes to determine where damping should take place for the particular cylinder 40.

Vibration and modal tests are then carried out in order to correlate the analytical and experimental results for optimization. In carrying out the modal test, the cylinder 40 is vibrated with a shaker, and accelerometers are placed around the cylinder 40 to measure the vibration amplitude for a given impact on the cylinder 40. This testing provides actual vibration frequencies, amplitudes and information as to the degree of damping. A comparison is then made between the actual vibration data obtained, and the model previously obtained, and if there is any discrepancy between actual vibration data obtained and the model, the model is modified to correlate it with the test data.

The next step involves stress/strain analysis to assess the potential danger of stress concentrations that could compromise the strength and integrity of the cylinder 40. Such results provide an upper bound on the allowable size of the bores 26 at the selected locations suitable to avoid stress concentrations in the cylinder 40. Thus, for example, it would be inadvisable to make the bores 26 too large in diameter such that the strength of the cylinder 40 would be materially reduced. This analysis determines the amount of freedom one has in selecting the bore size.

After determining the bore location and size, it is necessary to determine the type of damping material 12 which is required according to the vibration frequencies and amplitudes to be encountered. Thus, modal survey tests are carried out to compare the damping effectiveness of the various damping materials 12 or particles, or mixture of the particles, under realistic vibration conditions. For very low amplitude vibrations lighter damping particles are desirable, and for high amplitude vibrations, heavier damping materials are desirable. Also, some particles are more effective than others in some frequency ranges. Thus, an optimum selection of the most effective damping material particles or mixtures is then made, and the optimum fill or compaction level of the damping material 12 in the bores 26 is then chosen based upon the test results.

The proper size of bores 26 is then made at the selected locations in the cylinder 40, with appropriate particles being filled to the best fill level in the cylinder 40, after which the bores 26 are closed. Testing of the final design for vibration damping and performance is then carried out on the cylinder 40 after damping is completed, with the bores 26 being located in the main load path of the vibrations.

In an embodiment, steel shots of 0.007 inches and 0.011 inches in diameter have been used, with the bores 26 being filled to approximately 75% by the damping materials. Nickel or tungsten powder and hollow zirconium oxide balls of 0.01 inches in diameter have also been used. Alternatively, the damping material may comprise a mixture of silicon nitride powder and a polymer polysilazane, such as a mixture of 75% of the silicon nitride powder and 25% of the polymer polysilazane, and a small amount of silicon carbide. Vibration amplitude reductions with all of these damping materials 12 was accomplished similar to the vibration amplitude reductions for the tungsten powder discussed above.

Figure 5:
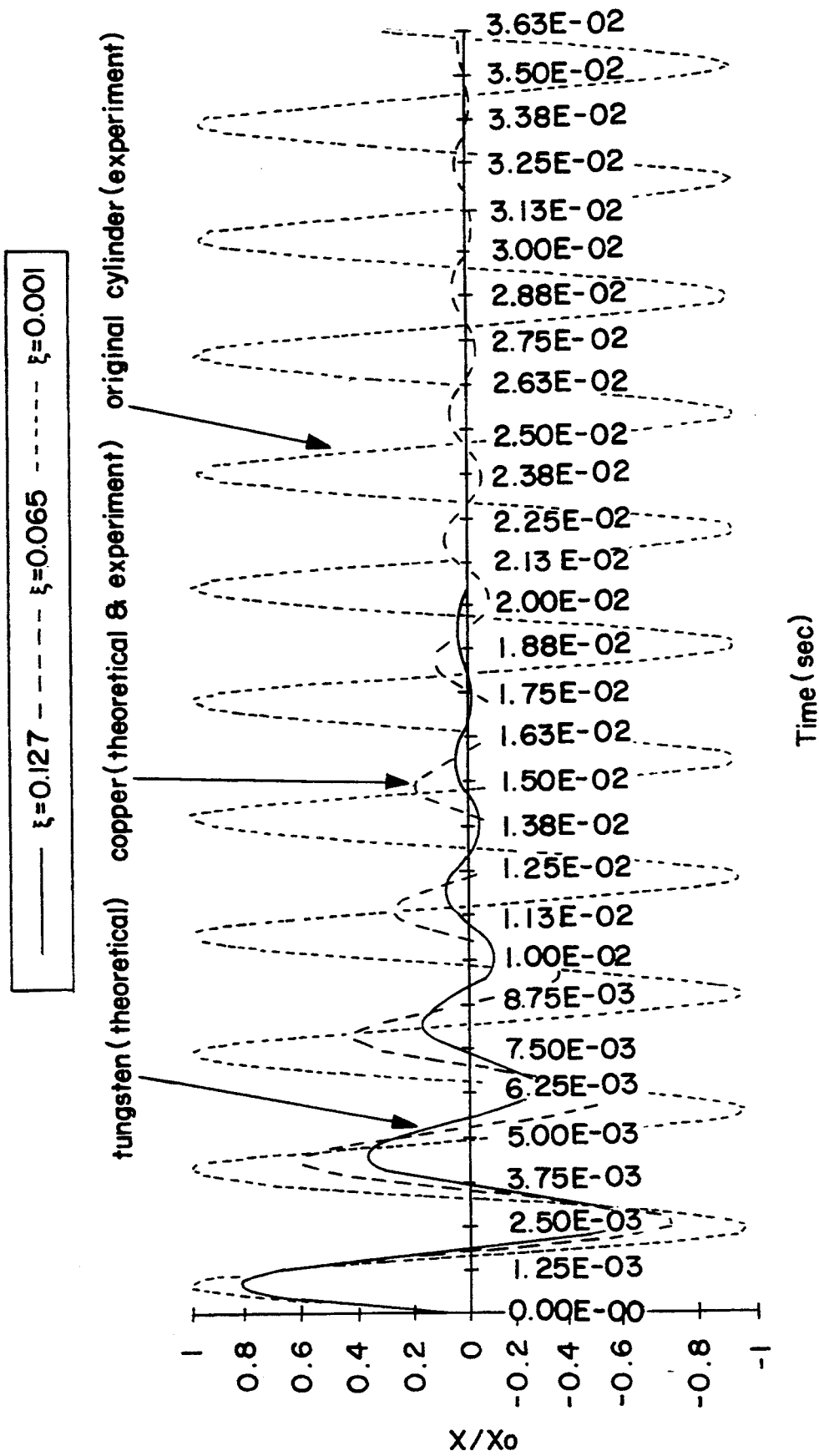
FIG. 5 is a chart showing the amplitude decay of the cylinder.

In accordance with a procedure of testing the damping effectiveness, the cylinder 40 may be vibrated by a suitable shaker with accelerometers on the cylinder 40 measuring the amount of vibration amplitude. From the values of the input from the shaker and the output from the accelerometers, a frequency response function and vibration amplitudes can be generated, as shown in FIG. 5, where the amplitude decay of the cylinder 40 is shown as a function of time t. The amplitude of the original cylinder 40 is shown in the chart, as well as the damping curves for the damping materials tungsten and copper where the cylinder 40 is shown as being significantly dampened in a relatively short period of time in order to eliminate vibrations of the cylinder 40 and provide improved printing on the web 14 without streaks.

Thus, in accordance with the present invention, an effective damping concept for the cylinder 40 is provided, with the main feature being the introduction of small amounts of damping material or particles inside the located bores 26 within the main load path of the cylinder 40. The main advantages of the invention over previous cylinders are (a) reduction of the overall mass of the cylinder 40, since the amount of mass taken out of the cylinder 40 while making the bores 26 is usually greater than the mass of particles introduced into the bores, (b) the independence of ambient conditions such as temperature, with the cylinder being effective under ambient conditions, and high or low centrifugal forces, (c) the integrity over the life of the cylinder, (d) the simplicity of implementation and low cost, since the bores 26 may be formed in the cylinder 40 as part of the manufacturing process, (e) the damping materials are potential contributors to energy dissipation such as momentum exchange, friction of the particles with the walls or bores 26, such that the damping material 12 absorbs or dissipates the vibration energy by rubbing against each other and against the walls of the bores 26, by flexure and bending of the particles, and by conversion of potential to kinetic and heat energy in order that the mechanisms of the present invention of energy absorption are much more numerous than the prior art cylinders and having much more potential for absorbing energy, and (f) increased structural fatigue life.

The initial design steps prior to implementation of the present invention for bore formation and incorporation of damping material therein thus include (1) thorough FEA for best location of the bores 26, (2) modal survey/vibration tests to correlate tests with FEA, (3) thorough stress analysis for optimum size of bores 26, and (4) experimentation for selection of the most desirable damping material or particles and the desired fill levels of damping material 12 in the bores 26.

The foregoing detailed description has been given for clearness of understanding only, and no unnecessary limitations should be understood therefrom, as modifications will be obvious to those skilled in the art.

What is claimed is:

1. A printing press, comprising:
   a rotatable cylinder having at least one cavity positioned within the cylinder;
   means for rotating the cylinder; and
   a damping material in said cavity to reduce the vibration amplitude of the cylinder, said damping material comprising a powder or larger particles.

2. The press of claim 1 wherein the cavity comprises at least one bore in the cylinder.

3. The cylinder of claim 2 wherein the bore extends laterally across the cylinder.

4. The press of claim 1 wherein the cavity comprises a plurality of spaced bores extending laterally across the cylinder adjacent from an outer surface of the cylinder.

5. The press of claim 1 wherein the damping material only partially fills said cavity.

6. The press of claim 1 including means for closing the cavity.

7. The press of claim 1 wherein the powder or particles comprise a metal material.

8. The press of claim 1 wherein the cavity comprises a bore having a diameter ranging from about 0.0001 inches to about 2 inches.

9. The press of claim 1 wherein the damping material is selected from the group consisting of solid metallic and non-metallic particles, and mixtures thereof.

10. The press of claim 1 wherein the damping material comprises ceramic particles.

11. The press of claim 10 wherein the ceramic particles is selected from the group consisting of zirconium oxide and silicon nitride particles.

12. The press of claim 1 wherein the damping material is selected from the group consisting of steel, aluminum, lead, copper, tungsten, nickel, and sodium.

13. The press of claim 1 wherein the damping material fills the cavity in the range of 70% to 90% of its volume.

14. The press of claim 1 wherein the cavity is located in the main load path of then cylinder.

15. A printing press, comprising:
   a cylinder having an outer surface, and a plurality of bores extending laterally across the cylinder adjacent the outer surface of the cylinder; and
   a damping material at least partially filling said bores to reduce the vibration amplitude of the cylinder, said damping material comprising a powder or particles.

* * * * *